(12) United States Patent
Kataoka et al.

(10) Patent No.: US 7,238,120 B2
(45) Date of Patent: Jul. 3, 2007

(54) RUBBER COMPOUND FOR SOLID GOLF BALLS AND SOLID GOLF BALL

(75) Inventors: Nobuyuki Kataoka, Chichibu (JP); Atsushi Nanba, Chichibu (JP); Hiroshi Higuchi, Chichibu (JP); Kazuhiko Nakamura, Tokyo (JP); Masataka Imoto, Ichikawa (JP)

(73) Assignee: Fujifilm Corporation, Tokyo (JP)

( * ) Notice: Subject to any disclaimer, the term of this patent is extended or adjusted under 35 U.S.C. 154(b) by 39 days.

(21) Appl. No.: 11/012,301

(22) Filed: Dec. 16, 2004

(65) Prior Publication Data

US 2005/0137031 A1 Jun. 23, 2005

(30) Foreign Application Priority Data

Dec. 19, 2003 (JP) ............................. 2003-422866

(51) Int. Cl.
*A63B 37/00* (2006.01)
(52) U.S. Cl. ...................................... 473/351; 525/193
(58) Field of Classification Search ............... 473/351, 473/377
See application file for complete search history.

(56) References Cited

U.S. PATENT DOCUMENTS

| | | | |
|---|---|---|---|
| 4,561,657 A | 12/1985 | Tominaga et al. | |
| 5,093,402 A | 3/1992 | Hashimoto et al. | |
| 5,096,201 A | 3/1992 | Egashira et al. | |
| 5,096,943 A | 3/1992 | Hashimoto et al. | |
| 6,646,053 B2 | 11/2003 | Yokota et al. | |
| 6,648,779 B2 | 11/2003 | Yokota et al. | |
| 2002/0065148 A1* | 5/2002 | Yokota et al. | ............... 473/367 |
| 2002/0103042 A1* | 8/2002 | Yokota | ........................ 473/367 |

FOREIGN PATENT DOCUMENTS

| | | |
|---|---|---|
| JP | 59-141961 A | 8/1984 |
| JP | 60-92781 A | 5/1985 |
| JP | 4-227733 A | 8/1992 |
| JP | 4-314465 A | 11/1992 |
| JP | 2720541 B2 | 11/1997 |
| JP | 2001-187167 A | 7/2001 |
| JP | 2002-85591 A | 3/2002 |
| JP | 2002-159595 A | 6/2002 |
| JP | 2002-200195 A | 7/2002 |

* cited by examiner

*Primary Examiner*—Raeann Trimiew
(74) *Attorney, Agent, or Firm*—Sughrue Mion, PLLC

(57) ABSTRACT

A rubber compound for solid golf balls which includes (A) a base rubber, (B) a filler, (C) an organic peroxide, and (D) a co-crosslinking agent coated with a coating rubber in which the ratio of the co-crosslinking agent to the coating rubber is from 100/1 to 100/20 by weight. A solid golf ball with good flight performance and uniform quality which is formed from the rubber compound. The rubber compound contains a co-crosslinking agent (a metal salt of unsaturated carboxylic acid) finely dispersed therein and also permits processing with good workability.

6 Claims, No Drawings

RUBBER COMPOUND FOR SOLID GOLF BALLS AND SOLID GOLF BALL

CROSS-REFERENCE TO RELATED APPLICATION

This non-provisional application claims priority under 35 U.S.C. §119(a) on Patent Application No. 2003-422866 filed in Japan on Dec. 19, 2003, the entire contents of which are hereby incorporated by reference.

BACKGROUND OF THE INVENTION

1. Field of the Invention

The present invention relates to a rubber compound for a homogeneous solid golf ball and also to a solid golf ball made of the rubber compound.

2. Description of the Related Art

It has been common practice to make a one-piece golf ball or a core of a multi-layered solid golf ball (in which the core is enclosed by a cover directly or with an intermediate layer placed between the core and the cover) by heat press molding from a rubber compound composed of a base rubber such as butadiene rubber, a co-crosslinking agent such as metal salt of unsaturated carboxylic acid, a weight-adjusting agent such as zinc oxide, and a free-radical initiator such as dicumyl peroxide. The above-mentioned co-crosslinking agent (which is a metal salt of unsaturated carboxylic acid) is suitably selected from zinc methacrylate or zinc acrylate for adequate control of the hardness and rebound resilience which the resulting golf ball should possess.

The zinc (meth) acrylate is compounded in a comparatively large amount (as much as 15 to 60 pbw) into the base rubber (100 pbw) so that the resulting golf ball has desired properties. Being a fine powder, this component tends to scatter and stick to mixing rolls, thereby impeding compounding operation. In addition, it readily forms agglomerates in the rubber compound, thereby substantially reducing its ratio in the rubber compound. Moreover, agglomeration in varied degrees leads to variation in quality. In other words, the resulting golf balls vary from lot to lot in hardness and rebound resilience or vary in performance depending on the hitting position.

There have been proposed several techniques as shown below to prevent the zinc (meth) acrylate from sticking to the mixing machine and to uniformly disperse it into the rubber compound.

Patent Document 1 (Japanese Patent No. 2720541) discloses a technique for uniformly dispersing a metal salt of unsaturated carboxylic acid into a rubber compound. This technique consists of mixing together a metal salt of unsaturated carboxylic acid and a rubber in liquid form, thereby giving a master batch, and subsequently compounding the master batch into rubber compound. The disadvantage of this technique is that the resulting rebound resilience of core still has room for improvement because it employs a liquid rubber having a low molecular weight.

Patent Document 2 (Japanese Patent Laid-open No. Hei 4-314465) and Patent Document 3 (Japanese Patent Laid-open No. Hei 4-227733) disclose a technique for forming a core. This technique consists of mixing together in liquid state a metal salt of unsaturated carboxylic acid and a rubber, and subsequently forming the mixture, with solvent removed, into a core. This technique, however, needs rubber in a relatively high ratio, and hence it is not suitable for an instance where a metal salt of unsaturated carboxylic acid is required in a large amount. Moreover, this technique consists of mixing together two solutions and subsequently removing solvent, thereby dispersing a metal salt of unsaturated carboxylic acid directly into rubber. Therefore, it needs additional steps of removing a large amount solvent and drying a large amount of rubber compound, which reduces workability. This is particularly true in the case where a metal salt of unsaturated carboxylic acid is added in a large amount.

Patent Document 4 (Japanese Patent Laid-open No. Sho 59-141961) and Patent Document 5 (Japanese Patent Laid-open No. Sho 60-92781) disclose a technique of compounding rubber with a metal salt of unsaturated carboxylic acid coated with a higher fatty acid or a salt thereof. The disadvantage of this technique is that mixing temperature has to be set higher than 100° C., which is undesirable for production cost and poses a problem with scorching and loss due to scattering.

Patent Document 6 (Japanese Patent Laid-open No. 2002-85591, Patent Document 7 (Japanese Patent Laid-open No. 2002-159595), and Patent Document 8 (Japanese Patent Laid-open No. 2002-200195) disclose a technique of compounding rubber with a metal salt of unsaturated carboxylic acid coated with a thermoplastic resin. The disadvantage of this technique is that mixing temperature has to be set higher than 100° C., which is undesirable for productivity. Another disadvantage is that the thermoplastic resin used for coating sometimes reduces the rebound resilience of resulting golf balls.

Patent Document 9 (Japanese Patent Laid-open No. 2001-187167) discloses a technique of compounding rubber with an unsaturated carboxylic acid coated with a sulfur-containing compound. This technique, however, does not completely prevent the coating material from sticking to the mixing machine.

Under these circumstance, there has been a demand for a rubber compound free of lot-to-lot variation that can be produced efficiently, with a metal salt of unsaturated carboxylic acid uniformly and finely dispersed therein (even when used in a large amount) and for a golf ball with stable quality and good flight performance.

SUMMARY OF THE INVENTION

The present invention was completed in view of the foregoing. It is an object of the present invention to provide a homogeneous rubber compound for solid golf balls which contains a co-crosslinking agent (such as a metal salt of unsaturated carboxylic acid) uniformly and finely dispersed therein and which can be produced with good workability. It is another object of the present invention to provide a golf ball produced from the rubber compound which has stable quality and good flight performance.

In order to achieve the above-mentioned object, the present inventors carried out a series of investigations. As the result, it was found that the above-mentioned object is achieved with a rubber compound which includes (A) a base rubber, (B) a filler, (C) an organic peroxide, and (D) a co-crosslinking agent coated with a coating rubber in which the ratio of the co-crosslinking agent to the coating rubber is from 100/1 to 100/20 by weight. The present invention is based on this finding.

The present invention is directed to a rubber compound for solid golf balls and a solid golf ball formed from the rubber compound, which are defined in the first to eighth aspects given below.

The First Aspect:

A rubber compound for solid golf balls which includes (A) a base rubber, (B) a filler, (C) an organic peroxide, and (D) a co-crosslinking agent coated with a coating rubber in which the ratio of the co-crosslinking agent to the coating rubber is from 100/1 to 100/20 by weight.

The Second Aspect:

The rubber compound for solid golf balls as defined in the first aspect, wherein the component (D) is a co-crosslinking agent coated with a coating rubber in which the ratio of the co-crosslinking agent to the coating rubber is from 100/1 to 100/9 by weight.

The Third Aspect:

The rubber compound for solid golf balls as defined in the first or second aspect, wherein the co-crosslinking agent is a mixture of a metal salt of unsaturated carboxylic acid and a metal salt of higher fatty acid, with the mixing ratio of the former to the latter being from 100/0 to 70/30 by weight.

The Fourth Aspect:

The rubber compound for solid golf balls as defined in the third aspect, wherein the metal salt of unsaturated carboxylic acid is zinc acrylate and/or zinc methacrylate.

The Fifth Aspect:

The rubber compound for solid golf balls as defined in the third or fourth aspect, wherein the metal salt of higher fatty acid is zinc stearate and/or zinc palmitate.

The Sixth Aspect:

The rubber compound for solid golf balls as defined in any one of the first to fifth aspects, wherein the coating rubber is one or more species selected from the group consisting of butadiene rubber, isoprene rubber, and natural rubber.

The Seventh Aspect:

The rubber compound for solid golf balls as defined in any one of the first to sixth aspects, wherein the component (A) is a butadiene rubber with cis-1,4-linkages accounting for no less than 40% in its molecule.

The Eighth Aspect:

A solid golf ball which includes a core and one or more covers, the core being formed from the rubber compound for solid golf balls as defined in any one of the first to seventh aspects.

According to the present invention, the rubber compound for solid golf balls exhibits uniform hardness and good rebound resilience on account of a co-crosslinking agent evenly dispersed therein. Moreover, it is capable of production with good workability. The golf ball formed from the rubber compound for golf balls is nearly free of lot-to-lot variation in rebound resilience and hardness and it exhibits nearly consisting flight performance regardless of the hitting position. The golf ball according to the present invention is very stable in quality and excellent in rebound resilience.

DESCRIPTION OF THE PREFERRED EMBODIMENTS

The invention will be described in more detail in the following.

The present invention is a rubber compound for solid golf balls which includes (A) a base rubber, (B) a filler, (C) an organic peroxide, and (D) a co-crosslinking agent coated with a coating rubber in which the ratio of the co-crosslinking agent to the coating rubber is from 100/1 to 100/20 by weight.

According to the present invention, the base rubber as component (A) may be a rubber to be made into the core of ordinary one-piece golf balls or multi-layered solid golf balls. Although it is not specifically restricted, it should desirably be a butadiene rubber with cis-1,4-linkages accounting for no less than 40% in its molecule, preferably no less than 60%, more preferably no less than 80%, further more preferably no less than 90%, and most preferably no less than 95%. A failure to meet to this requirement will result in poor rebound resilience.

The butadiene rubber as component (A) should have a Mooney viscosity ($ML_{1+4}$ (100° C.)) no lower than 40, preferably no lower than 50, more preferably no lower than 52, further more preferably no lower than 54, and no higher than 140, preferably no higher than 120, more preferably no higher than 100, most preferably no higher than 80. The butadiene rubber will be poor in workability or poor in rebound resilience if its Mooney viscosity is excessively high or low, respectively.

Incidentally, the Mooney viscosity as used in the present invention is an industrial index of viscosity (provided in JIS-K6300) to be measured with a Mooney viscometer, which is one type of rotary plastometer. It is expressed by ML1+4 (100° C.) as the unit symbol, in which M stands for Mooney viscosity, L stands for a large rotor (type L), 1+4 means that the duration of preliminary heating is 1 minute and the duration of rotor rotation is 4 minutes, and 100° C. means that measurements are carried out at 100° C.

Also, the butadiene rubber as component (A) should have a molecular weight distribution ($Mw/Mn$, where $Mw$ is the weight-average molecular weight and $Mn$ is the number-average molecular weight) no smaller than 2.0, preferably no smaller than 2.2, more preferably no smaller than 2.4, and most preferably no smaller than 2.6, and no larger than 8.0, preferably no larger than 7.5, more preferably no larger than 4.0, most preferably no larger than 3.4. The butadiene rubber will be poor in workability or poor in rebound resilience if $Mw/Mn$ is excessively small or large, respectively.

Incidentally, the molecular weight distribution in the present invention is determined by GPC method (with THF as a solvent) and expressed as that of styrene.

The butadiene rubber as component (A) may optionally be compounded with diene rubber such as styrene-butadiene rubber, natural rubber, isoprene rubber, and ethylene-propylene-diene rubber, in an amount not harmful to the effect of the present invention.

The filler as component (B) includes inorganic ones, such as zinc oxide, barium oxide, and calcium carbonate. Its amount for 100 pbw of component (A) is no less than 1 pbw, preferably no less than 3 pbw, more preferably no less than 5 pbw, most preferably no less than 7 pbw, and no more than 130 pbw, preferably no more than 50 pbw, more preferably no more than 45 pbw, most preferably no more than 40 pbw.

The organic peroxide as component (C) may be any commercial one, such as Percumyl D, Perhexa 3M, Perhexa C, Perhexa HC, and Perhexa TMH (all from NOF Corporation) and Luperco 231XL (from Atochem). They may be used alone or in combination with one another.

The amount of component (C) for 100 pbw of component (A) should be no less than 0.1 pbw, preferably no less than 0.3 pbw, more preferably no less than 0.5 pbw, most preferably no less than 0.7 pbw, and no more than 5 pbw, preferably no more than 4 pbw, more preferably no more than 3 pbw, most preferably no more than 2 pbw. If the amount of component (C) for component (A) is excessively large or small, the resulting golf ball will be poor in rebound resilience, hitting feel, and durability.

The co-crosslinking agent coated with coating rubber as component (D) may be a metal salt of unsaturated carboxylic acid or a mixture of a metal salt of unsaturated carboxylic acid and a metal salt of higher fatty acid, so that it contributes to rebound resilience.

Examples of the metal salt of unsaturated carboxylic acid include zinc salt or magnesium salt of unsaturated carboxylic acid, such as acrylic acid, methacrylic acid, maleic acid, and fumaric acid. They may be used alone or in combination with one another.

Examples of the metal salt of higher fatty acid include zinc salt or magnesium salt of higher fatty acid, such as stearic acid, palmitic acid, 12-hydroxystearic acid, behenic acid, oleic acid, linolic acid, linolenic acid, arachidic acid, lignoceric acid, lauric acid, and myristic acid. They may be used alone or in combination with one another.

Of these metal salts of unsaturated carboxylic acid, zinc acrylate and zinc methacrylate are desirable. The metal salt of unsaturated carboxylic acid may be used in a completely neutralized form [Chemical formula 1] or a partly neutralized form [Chemical formula 2] as shown below.

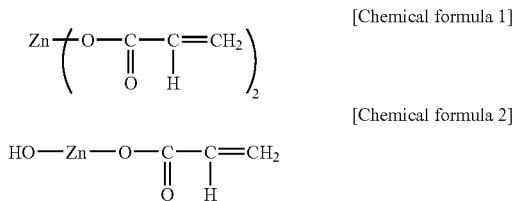

[Chemical formula 1]

[Chemical formula 2]

In the case where the co-crosslinking agent as component (D) is a mixture of a metal salt of unsaturated carboxylic acid and a metal salt of higher fatty acid, the latter should account for (in the total amount) no less than 0 wt %, preferably no less than 5 wt %, more preferably no less than 10 wt %, and no more than 30 wt %, preferably no more than 20 wt %. An excessive amount more than 30 wt % will adversely affect rebound resilience.

The amount of component (D) for 100 pbw of component (A) should be no less than 10 pbw, preferably no less than 15 pbw, more preferably no less than 20 pbw, and no more than 60 pbw, preferably no more than 50 pbw, further preferably no more than 45 pbw, most preferably no more than 40 pbw. An excessively small or large amount will adversely affect rebound resilience or hitting feel, respectively.

The coating rubber to coat the co-crosslinking agent as component (D) includes, for example, butadiene rubber, isoprene rubber, butadiene-isoprene rubber, butadiene-styrene rubber, butene rubber, and ethylene-propylene rubber. For good rebound resilience, it should preferably be one or two or more species selected from butadiene rubber, isoprene rubber, and natural rubber.

The coating rubber should have a Mooney viscosity ($ML_{1+4}$ (100° C.)) no lower than 10, preferably no lower than 20, more preferably no lower than 30, and no higher than 150, preferably no higher than 100, more preferably no higher than 80, most preferably no higher than 60.

The amount of the coating rubber for 100 pbw of the co-crosslinking agent should be no less than 1 pbw, preferably no less than 3 pbw, more preferably no less than 5 pbw, and no more than 20 pbw, preferably no more than 15 pbw, more preferably no more than 9 pbw. An excessively small amount (below 1 pbw) is not effective in improving workability. On the other hand, an excessively large amount (above 20 pbw) adversely affects workability due to increase in solution viscosity at the time of coating.

The rubber compound for solid golf balls is composed of the above-mentioned components (A) to (D) as essential ingredients. It may also be compounded with optional ingredients, such as plasticizer, age resistor, and others commonly used for one-piece golf balls or the core of multi-layered solid golf balls. The age resistor may be any commercial one, such as Nocrac NS-6 and NS-30 (from Ouchishinko Chemical Industrial Co., Ltd.) and Yoshinox 425 (from Yoshitomi Pharmaceutical Industrial Co., Ltd.).

The rubber compound for solid golf balls may optionally be compounded with an organosulfur compound for adjustment of rebound resilience. The organosulfur compound includes thiophenols, thionaphthols, halogenated thiophenols, and metal salts thereof. Their typical examples are pentachlorothiophenol, pentafluorothiophenol, pentabromothiophenol, p-chlorothiophenol, and their zinc salts such as the zinc salt of pentachlorothiophenol; and diphenylpolysulfide, dibenzylpolysulfide, dibenzoylpolysulfide, dibenzothiazoylpolysulfide, and dithiobenzoylpolysulfide, which have 2 to 4 sulfur atoms. Preferable among them are zinc salt of pentachlorothiophenol and diphenyldisulfide.

The amount of the organosulfur compound for 100 pbw of the base rubber as component (A) should be no less than 0.1 pbw, preferably no less than 0.2 pbw, more preferably no less than 0.5 pbw, and no more than 5 pbw, preferably no more than 4 pbw, more preferably no more than 3 pbw, most preferably no more than 2 pbw.

The rubber compound for golf balls should preferably be compounded with a metal salt of higher fatty acid for improvement in mixing performance. The amount of this ingredient for 100 pbw of the base rubber should be less than 0.5 pbw, preferably no less than 1.0 pbw, and no more than 10 pbw, preferably no more than 7 pbw. One or more than one species of this ingredient may be used.

The rubber compound for solid golf balls may be prepared in two steps of coating the co-crosslinking agent with the coating rubber, thereby preparing component (D), and mixing component (D) with components (A) to (C). This manufacturing method prevents the co-crosslinking agent from scattering and sticking to the mixing machine during mixing, thereby improving workability and productivity. Moreover, it permits the co-crosslinking agent to be finely dispersed into the rubber, thereby improving the quality of the rubber compound and reducing lot-to-lot quality variation.

The rubber coating process is not specifically restricted so long as it is capable of coating the co-crosslinking agent with the coating rubber. It may consist of a first step (I) of preparing a solvent solution in which the co-crosslinking agent is dispersed and the coating rubber is dissolved and a second step (II) of removing solvent from the thus prepared solution. This process is desirable for equipment and workability.

The first step (I) may be accomplished by suspending the co-crosslinking agent in a solvent and then adding the coating rubber to the resulting suspension with stirring. Alternatively, it may be accomplished:

(i) by suspending the co-crosslinking agent in a solvent, (ii) by dissolving the coating rubber in a solvent, and (iii) by mixing together the suspension (of the co-crosslinking agent) and the solution (of the coating rubber).

The solvent to be used in the first step (I) may be selected from organic solvents (particularly aromatic organic solvents) such as toluene, xylene, benzene, and cyclohexane, according to the kind of the coating rubber and co-crosslinking agent.

The solvents to be used in the sub-steps (i) and (ii) may be identical or different so long as they are miscible with each other.

In the case where the step (I) consists of sub-steps (i) to (iii), the co-crosslinking agent should be used in such an amount no lower less than 150 g/L, preferably no less than 200 g/L, and no more than 300 g/L, preferably no more than 250 g/L. An excessively low (below 150 g/L) or high (above 300 g/L) concentration would result in poor productivity or poor mixing performance (and hence low uniformity), respectively.

The concentration of the coating robber in the solution prepared in the sub-step (ii) should be no lower than 4 g/L, preferably no lower than 10 g/L, and no higher than 40 g/L, preferably no higher than 30 g/L. An excessively low (below 4 g/L) or high (above 40 g/L) concentration would result in insufficient coating or poor workability (due to long time for dissolution and high viscosity), respectively.

In the first step (I), the co-crosslinking agent to be added to a solvent is previously in the form of metal salt. Alternatively, it is also possible to add an unsaturated carboxylic acid and a metal oxide or hydroxide to a solvent so that they react with each other to form the metal salt in the solvent.

The second step (II) is intended to remove the solvent which has been used in the first step (I). The solvent removal may be accomplished by heating, preferably under reduced pressure (vacuum drying, etc.).

The process of producing the rubber compound for solid golf balls consists of a first step of coating the co-crosslinking agent with the coating rubber, thereby preparing component (D), and a second step of mixing component (D) with components (A) to (C). Mixing for the second step may be accomplished by any method with an adequate mixing machine, such as a roll mill and Banbury mixer.

The solid golf ball according to the present invention is formed from the rubber compound for solid golf balls by using a mold with heating under pressure. The golf ball may be a one-piece golf ball or a multi-layered solid golf ball. In the latter case, the rubber compound for gold balls is made into a core, which is subsequently covered with one or more covers, for improved rebound resilience.

The molding condition may be such that the vulcanizing temperature is 100 to 200° C. and the duration of vulcanization is 10 to 40 minutes.

In the case where the rubber compounds for golf balls is used to make the solid core, the diameter of the solid core should be no smaller than 30.0 mm, preferably no smaller than 32.0 mm, more preferably no smaller than 35.0 mm, most preferably no smaller than 37.0 mm, and no larger than 41.0 mm, preferably no larger than 40.5 mm, more preferably no larger than 40.0 mm, most preferably no larger than 39.5 mm. The diameter of the solid core for two-piece solid golf ball should be no smaller than 37.0 mm, preferably no smaller than 37.5 mm, more preferably no smaller than 38.0 mm, most preferably no smaller than 38.5 mm, and no larger than 41.0 mm, preferably no larger than 40.5 mm, more preferably no larger than 40.0 mm. The diameter of the solid core for three-piece solid golf ball should be no smaller than 30.0 mm, preferably no smaller than 32.0 mm, more preferably no smaller than 34.0 mm, most preferably no smaller than 35.0 mm, and no larger than 40.0 mm, preferably no larger than 39.5 mm, more preferably no larger than 39.0 mm.

The solid golf ball according to the present invention varies in its form as mentioned above. In the case where the rubber compound for golf balls is made into a one-piece golf ball or a solid core, they should have an adequate resilience such that they undergo deflection under a load of 980 N (100 kg) which is no less than 2.0 mm, preferably no less than 2.5 mm, more preferably no less than 2.8 mm, most preferably no less than 3.2 mm, and no more than 6.0 mm, preferably no more than 5.5 mm, more preferably no more than 5.0 mm, most preferably no more than 4.5 mm. With an excessively small amount of deflection, the resulting golf ball is poor in hitting feel and results in a short flying distance due to excessive spin (at the time of driver shot that causes large deformation). With an excessively large amount of deflection, the resulting golf gall has a dull hitting feel and results in a short flying distance due to insufficient rebound resilience and is also poor in resistance to cracking by repeated hitting.

In the case where the solid golf ball of the present invention is a two-piece golf ball or a multi-piece golf ball, they may be produced by covering the solid core (which has been prepared by heat molding) with a known cover and an intermediate layer by injection molding or press molding.

The cover and the intermediate layer may be formed from any known thermoplastic or thermosetting elastomers, such as polyurethane elastomer, polyester elastomer, ionomer resin, and polyolefin elastomer. They may be used alone or in combination with one another. Preferable among them is thermoplastic polyurethane elastomer and ionomer resin.

The thermoplastic polyurethane elastomer is commercially available under the trade name of Pandex T7298, T7295, T7890, TR-3080, T8295, and T8290 (all from DIC Bayer Polymer Ltd.), which are produced from aliphatic or aromatic diisocyanate. The ionomer resin is commercially available under a trade name of Surlyn 6320 and 8120 (from Du Pont in USA), and Himilan 1706, 1605, 1855, 1601, and 1557 (all from Du Pont-Mitsui Polychemicals Co., Ltd.).

The primary material for the cover or the intermediate layer may be compounded with an optical component such as polymer, excluding the above-mentioned thermoplastic elastomer. Examples of such a polymer include polyamide elastomer, styrene-based block elastomer, hydrogenated polybutadiene, and ethylene-vinyl acetate (EVA) copolymer.

The solid golf ball according to the present invention may be produced by any known method which is not specifically restricted. In the case where the golf ball is a two-piece or multi-piece solid golf ball, the solid core, which has previously been prepared by heat molding, is placed in a mold and then covered with a material for the cover or the intermediate layer by injection molding or press molding.

In the case of a multi-piece solid golf ball, the thickness of the intermediate layer should be no smaller than 0.5 mm, preferably no smaller than 1.0 mm, and no larger than 3.0 mm, preferably no larger than 2.5 mm, more preferably no larger than 2.0 mm, most preferably no larger than 1.6 mm.

The thickness of the cover for a two-piece golf ball or multi-piece golf ball should be no smaller than 0.7 mm, preferably no smaller than 1.0 mm, and no larger than 3.0 mm, preferably no larger than 2.5 mm, more preferably no larger than 2.0 mm, and most preferably no larger than 1.6 mm.

The solid golf ball according to the present invention should conform with the Rules of Golf. The diameter of the golf ball should be no smaller than 42.67 mm and no larger than 44.0 mm, preferably no larger than 43.5 mm, more preferably no larger than 43.0 mm. The weight of the golf ball should be no heavier than 45.93 g, and normally no lighter than 44.5 g, preferably no lighter than 45.0 g, more preferably no lighter than 45.1 g, further more preferably no lighter than 45.2 g.

EXAMPLES

The invention will be described in more detail with reference to the following examples, which are not intended to restrict the scope thereof.

Examples 1 to 6 and Comparative Example 1

A co-crosslinking agent was suspended in toluene according to the formulation (in pbw) shown in Table 1. Subsequently, butadiene rubber was uniformly dissolved in the suspension. The resulting solution was freed of toluene by heating (with hot air) and vacuum drying. Thus there were obtained six kinds of rubber-coated zinc acrylate, which are designated as compositions A to D, F, and G.

A rubber compound was prepared from the following components according to the formulation shown in Table 2.
BR as the base rubber (butadiene rubber "BR01" from JSR Corporation).
Any of compositions A to D, F, and G, or zinc acrylate.
Zinc oxide as a filler.
Dicumyl peroxide as an organic peroxide ("Percumyl D", from NOF Corporation).

They were mixed at 50 to 90° C. by using a kneader (from Moriyama Seisakusho, K.K.). The resulting rubber compound was formed into a core (39.2 mm in outside diameter) for a two-piece golf ball by vulcanization in a mold at 160° C. for 15 minutes.

The zinc acrylate was examined for sticking to the kneader and scattering during mixing. The resulting core was tested for deflection under a load of 100 kg (980 N) and for initial velocity. The following criteria were used for evaluation. The results are shown in Table 2.

TABLE 1

|  | (pbw) | A | B | C | D | E | F | G |
|---|---|---|---|---|---|---|---|---|
| Toluene |  | 400 | 400 | 400 | 400 | 400 | 400 | 400 |
| Co-crosslinking agent | Zinc acrylate | 100 | 100 | 100 | 100 | 100 |  |  |
|  | Zinc acrylate/zinc stearate (85/15) |  |  |  |  |  | 100 | 100 |
| BR (butadiene rubber) |  | 2 | 5 | 9 | 20 | 30 | 5 | 9 |
| BR/Toluene (1 L) |  | 4.3 | 10.8 | 19.5 | 43.3 | 65 | 10.8 | 19.5 |
| Workability |  | good | good | good | fair | poor | good | good |

BR/Toluene (1 L):
The values are expressed in terms of the amount (in grams) of butadiene rubber dissolved in 1 liter of toluene.

Workability:
Workability was rated according to the following criterion in terms of the length of time required for BR to dissolve and for the solution to become homogeneous by stirring.
good: shorter than 3 hours.
fair: from 3 hours to shorter than 6 hours.
poor: longer than 6 hours and/or too viscous to stir.

TABLE 2

|  | (pbw) | Example 1 | Example 2 | Example 3 | Example 4 | Example 5 | Example 6 | Comparative Example 1 |
|---|---|---|---|---|---|---|---|---|
| Formulation for components | BR | 99.54 | 98.85 | 97.93 | 95.4 | 98.85 | 97.93 | 100 |
|  | Composition A | 23.46 |  |  |  |  |  |  |
|  | Composition B |  | 24.15 |  |  |  |  |  |
|  | Composition C |  |  | 25.07 |  |  |  |  |
|  | Composition D |  |  |  | 27.6 |  |  |  |
|  | Composition F |  |  |  |  | 24.15 |  |  |
|  | Composition G |  |  |  |  |  | 25.07 |  |
|  | Zinc acrylate |  |  |  |  |  |  | 23 |
|  | Zinc oxide | 23.5 | 23.5 | 23.5 | 23.5 | 23.5 | 23.5 | 23.5 |
|  | Zinc stearate | 3 | 3 | 3 | 3 |  |  | 3 |
|  | Dicumyl peroxide | 1 | 1 | 1 | 1 | 1 | 1 | 1 |
| Evaluation of core | Sticking to kneader | little | none | none | none | none | none | much |
|  | Powder scattering | little | little | none | none | little | none | much |
|  | Core hardness (mm) | 3.71 | 3.66 | 3.61 | 3.65 | 3.69 | 3.67 | 3.85 |
|  | Core hardness ($\sigma$) | 0.06 | 0.05 | 0.04 | 0.04 | 0.04 | 0.04 | 0.10 |
|  | Initial velocity (m/s) | 76.95 | 77.1 | 77.15 | 77.08 | 77.11 | 77.15 | 76.85 |
|  | Initial velocity ($\sigma$) | 0.11 | 0.10 | 0.10 | 0.09 | 0.10 | 0.08 | 0.18 |

Sticking to Kneader:

The rotor and inside wall of the kneader were observed after mixing, and the amount of powder sticking to them was visually inspected.

Powder Scattering:

This was rated by observing the powder which is blown up when the ram of the kneader moves up and down during mixing.

Core Hardness (mm):

The amount of the deflection which the core undergoes under a load of 100 kg. The larger the value, the softer the core.

Core Hardness ($\sigma$):

Standard deviation of measured values for N=12.

Initial Velocity (m/s):

Measured by using an initial velocity measuring apparatus of the drum rotary type of USGA approved by R&A. The test was carried out at room temperature (23±1° C.) after the ball had been conditioned at 23±1° C. for 3 hours or longer. The ball was hit at a striking velocity of 143.8 ft/s (43.83 m/s) with a striking mass of 250 pounds (113.4 kg). One dozen of balls were hit four times each. The initial velocity was calculated from time required for the ball to travel over a distance of 6.28 ft (1.91 m). One cycle of test took about 15 minutes.

Initial Velocity ($\sigma$):

Standard deviation of measured values for N=12.

In Examples 1 to 6, the loss of zinc acrylate was less than that in Comparative Example 1. Moreover, in Examples 1 to 6, the core was better in hardness and initial velocity than that in Comparative Example 1. The samples in Examples 1 to 6 were more uniform as indicated by the standard deviation than that in Comparative Example 1. Note that the standard deviation of hardness and initial velocity is 0.04 to 0.06 and 0.08 to 0.11, respectively, in Examples 1 to 6, whereas it is 0.10 and 0.18, respectively, in Comparative Example 1.

The rubber compound was visually observed after mixing. The rubber compound in Comparative Example 1 was found to contain agglomerates remaining undispersed. By contrast, the rubber compounds in Examples 1 to 6 were found to be uniform, free of agglomerates remaining undispersed.

Japanese Patent Application No. 2003-422866 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A rubber compound for solid golf balls which comprises (A) a base rubber, (B) a filler, (C) an organic peroxide, and (D) a co-crosslinking agent coated with a coating rubber in which the ratio of the co-crosslinking agent to the coating rubber is from 100/1 to 100/20 by weight, wherein the coating rubber is one or two or more species selected from the group consisting of butadiene rubber, isoprene rubber, and natural rubber.

2. The rubber compound for solid golf balls of claim 1, wherein the component (D) is a co-crosslinking agent coated with a coating rubber in which the ratio of the co-crosslinking agent to the coating rubber is from 100/1 to 100/9 by weight.

3. The rubber compound for solid golf baUs of claim 1, wherein the co-crosslinking agent is a mixture of a metal salt of unsaturated carboxylic acid and a metal salt of higher fatty acid, with the mixing ratio of the former to the latter being from 100/0 to 70/30 by weight.

4. The rubber compound for solid golf balls of claim 3, wherein the metal salt of unsaturated earboxylic acid is zinc acrylate and/or zinc methacrylate.

5. The rubber compound for solid golf balls of claim 3, wherein the metal salt of higher fatty acid is zinc stearate and/or zinc palmitate.

6. The rubber compound for solid golf balls of claim 1, wherein the component (A) is a butadiene rubber with cis-1,4-linkages accounting for no less than 40% in its molecule.

* * * * *

UNITED STATES PATENT AND TRADEMARK OFFICE
CERTIFICATE OF CORRECTION

| | |
|---|---|
| PATENT NO. | : 7,238,120 B2 |
| APPLICATION NO. | : 11/012301 |
| DATED | : July 3, 2007 |
| INVENTOR(S) | : Nobuyuki Kataoka et al. |

Page 1 of 1

It is certified that error appears in the above-identified patent and that said Letters Patent is hereby corrected as shown below:

Title Page under "Assignee" (item 73) please amend the name as follows:

~~Fujifilm Corporation~~<u>BRIDGESTONE SPORTS CO., LTD and NIPPON SHOKUBAI CO., LTD.</u>

Signed and Sealed this

Twenty-ninth Day of January, 2008

JON W. DUDAS
*Director of the United States Patent and Trademark Office*